United States Patent Office 3,310,514
Patented Mar. 21, 1967

3,310,514
VINYLIDENE CHLORIDE COPOLYMER LATICES AND PRODUCTS PRODUCED THEREFROM
Alex Trofimow, Brookline, and Elizabeth C. Dearborn, Boston, Mass., assignors to W. R. Grace & Co., Cambridge, Mass., a corporation of Connecticut
No Drawing. Filed Mar. 9, 1964, Ser. No. 350,542
4 Claims. (Cl. 260—29.6)

This invention relates to vinylidene chloride copolymers containing polymerized methacrylonitrile and more particularly vinylidene chloride copolymer latices containing polymerized methacrylonitrile.

Polymerized vinylidene chloride latices capable of forming films are of particular importance in providing barrier films and coatings for packaging materials such as paperboard, glassine, and polyolefin films, particularly packaging materials for the food industry. The property of such films which makes them so desirable as barrier layers is the high resistance of polymerized vinylidene chloride to moisture vapor transmission, oxygen transmission, and resistance to grease and oil. However, unmodified polymerized vinylindene chloride alone is inferor for such barrier uses because it forms a weak and brittle layer. In order to provide suitable films or coatings having high moisture vapor barrier characteristics while at the same time providing the necessary strength and flexibility, vinylidene chloride has been polymerized with various polymerizable organic compounds as comonomers.

Vinylidene chloride copolymer latices are generally evaluated on the basis of three properties of the free film or coating formed from such latices: flexibility, degree of blocking (adherence of the copolymer layer to another layer), and the moisture vapor transmission rate (MVTR). Generally, the MVTR is determined by the vinylidene chloride content; a high vinylidene chloride level provides good barrier properties while the flexibility and blocking are determined by the particular comonomers used. The preferred latices, therefore, are generally a balance of essentially opposing monomer properties.

It has now been found that by the introduction of methacrylonitrile as a comonomer into the vinylidene chloride latices with at least a third comonomer, both decreased tendency toward blocking and better MVTR values are achieved.

The novel vinylidene chloride copolymer latices of the present invention comprise a predominant amount of vinylidene chloride and relatively minor amounts of methacrylonitrile and at least a third comonomer.

The methacrylonitrile in the latices reduces the tendency toward blocking as a result of an increased hardness imparted to the films by the methacrylonitrile. The adverse effect that the methacrylonitrile may have on the scoreability or flexibility of the films may be compensated for, at least to a degree, by decreasing the vinylidene chloride. The heat and light stability of vinylidene chloride copolymers increase with decreasing amounts of vinylidene chloride in the polymer. However, decreasing the vinylidene chloride generally adversely affects the MVTR values. As stated above, the methacrylonitrile contributes to an improved MVTR value, which permits a lowering of the vinylidene chloride content without substantial diminution of the total barrier characteristics.

The novel copolymer latices of the present invention comprise from 80 to 94 percent vinylidene chloride, 1 to 5 percent methacrylonitrile, and at least a third comonomer. As examples of suitable comonomers, mention may be made of methyl acrylate, methyl methacrylate, ethyl acrylate, butyl acrylate, and acrylonitrile. Other monomers known to the art to be copolymerizable with vinylidene in the formation of copolymer latices may be used. It should be noted that when acrylonitrile is used, it is used in at least a four-monomer system, e.g., vinylidene chloride, acrylonitrile, methacrylonitrile, plus a fourth monomer.

The preferred copolymers within the scope of the present invention comprise 88 to 90 percent vinylidene chloride, 2 to 5 percent methacrylonitrile, and at least a third comonomer. Particularly preferred latices comprise 89 percent vinylidene chloride, 4 percent methyl acrylate, 5 percent methyl methacrylate, and 2 percent methacrylonitrile; and 89 percent vinylidene chloride, 6 percent methyl acrylate, and 5 percent methacrylonitrile.

It should be understood that all the formulations set forth in the present invention represent the weight percent of the monomer charge.

The following table illustrates non-limiting examples of compositions within the scope of the present invention as well as a control (Example 3) which contains no methacrylonitrile.

| Monomers | Example (parts by weight) | | | | | |
|---|---|---|---|---|---|---|
| | 1 | 2 | 3 | 4 | 5 | 6 |
| Vinylidene chloride | 133.5 | 133.5 | 133.5 | 133.5 | 133.5 | 133.5 |
| Methyl acrylate | 9.0 | 9.0 | 9.0 | 9.0 | 9.0 | 9.0 |
| Acrylonitrile | | 3.75 | 7.5 | | | |
| Methacrylonitrile | 7.5 | 3.81 | | 3.0 | 5.25 | 7.5 |
| Methyl methacrylate | | | | 7.5 | 5.25 | 3.0 |

4.4 parts of sodium dodecyl benzene sulfonate as an emulsifier and 0.4 part acrylic acid were also used in all of the above formulations.

The novel vinylidene chloride copolymer latices were prepared by the following procedure:

Into a closed vessel was placed 105 cc. of water and 20 ml. of potassium persulfate. An initial charge of 20 ml. of monomer phase (including the monomer, emulsifier, and acrylic acid) was added to the vessel and 5 ml. of monomer phase was thereafter added at 3 minute intervals. Five minutes after the initial monomer charge, 4 ml. of a 0.34 percent sodium sulfite solution was added to the reaction. The reaction was continued at 35° C. for 15 minutes, and then every six minutes thereafter 3 ml. of monomer phase and 1 ml. of sodium sulfite were added until all the reactants had been placed into the reaction vessel. The entire reaction was carried out in a nitrogen atmosphere.

Any emulsifier capable of operating in an acid medium may be used in preparing the latices of the present invention. For example, the soluble salts of an aryl sulfonic acid or of a long chain alkyl or aryl sulfate such as sodium dodecyl benzene sulfonate and sodium lauryl sulfate are satisfactory. The emulsifier is generally employed in an amount of about 1 to 10 percent of the weight of the water-immiscible materials present.

Any of the conventional peroxides, persulfates or azo compounds can be utilized as catalysts. Among the suitable catalysts may be mentioned potassium persulfate, sodium persulfate, hydrogen peroxide, peracetic acid, benzoyl peroxide, azo-bis-isobutyronitrile, cumene hydroperoxide, tertiary butyl perbenzoate, redox catalyst such as a combination of any of the peroxygen catalysts mentioned above together with reducing agents such as sodium sulfite, sucrose, ferrous gluconate, etc. The amount of the catalyst may be varied over a relatively wide range; generally about 0.1 percent to about 0.5 percent by weight of the materials to be polymerized is used.

Film formation of the latex of the instant invention will take place by depositing a coating of the latex on any suitable substrate and drying it in air for about two minutes at room temperature. Free films may be obtained by depositing the latex on a nonporous surface of a substrate and stripping the dried film from the substrate. If a shorter drying cycle is required, temperatures as high as about 105° C. may be used. It has been found, however, that if excessive drying temperatures are employed, film discoloration may occur and in some cases, blistering of the film has been observed.

Various methods or means of depositing a coating of the latex on any suitable substrate may be used. Any type of mechanism or device which is capable of depositing a uniform amount in the desired thickness to the substrate may be employed. Special types which may be used include air knife coater, horizontal and vertical size presses, trailing blade, transfer roll, reverse roll, roller coater, gravure, bead coat, metering bar, spray coater, and curtain coater. Deposition may be carried out in one or a number of applications.

Some coating methods may require an increase in the viscosity of the latex. In such case, the viscosity change may be brought about without interfering with film-forming properties by the addition of suitable thickening agents, such as sodium alginate, karaya gum, hydroxyethyl cellulose, and polyvinyl alcohol. Ordinarily, satisfactory results are obtained with less than 1 percent of the thickening agent based on the weight of the dispersed solids.

The following test procedures were used to determine scoreability and blocking of the latex coatings and films.

*Score test procedure.*—Latex coatings were made on paperboard (International Paper Company Moss Cote 15 point board having a clay-coated surface) using a No. 16 Mayer Rod and at a coating weight of 14 to 16 pounds per ream (3000 square feet). The coating was immediately dried in a forced air oven at 120° C. for 20 seconds. The coated board was then cut into strips approximately 10 inches by 3½ inches, aged, scored and dyed.

The samples were normally aged at 75° F. and 50 percent relative humidity. Accelerated aging studies were carried out at 122° F. in a forced air oven with 24 hour preconditioning at 75° F. and 50 percent relative humidity before scoring.

The Boxboard Research and Development Association Binding Tester (Lyon Machinery Builders, Kalamazoo, Michigan) was used for all score tests. This instrument is essentially a hydraulic press equipped with a scoring die. The male die in the series used is 0.028 inch and the six female dies varied from 0.054 inch to 0.094 inch in width with 0.000 inch penetration of the scoring rule into the female die.

The coated surfaces were then painted with a Congo red dye solution containing a slight amount of emulsifier to aid wetting. The dye was immediately rinsed off with running water. Dye was visible only on those lines where the film had failed.

Samples were evaluated on the basis of relative breakdown. A sample which showed just enough breakdown to cause dye penetration through the film over all of the male and female scores was arbitrarily given a value of 5 and a sample showing no penetration was arbitrarily given a value of zero. Intermediate degrees of dye penetration were assigned values between 0 and 5.

*Blocking test procedure.*—The latex coatings were made with No. 16 Mayer Rod (on the clay-coated surface of International Paper Company Moss Cote paperboard) at a coating weight of 14 to 16 pounds per ream (3000 square feet) and dried at 120° C. for 20 seconds. One inch squares were cut with a dye from the coated as well as the uncoated board and stacked under a pressure of 500 grams per square inch for three hours at 50° C. in a forced air oven. The samples were allowed to cool to room temperature and were then separated.

Evaluations as to the degree of blocking were based on the following criteria:

| Rating | Blocking Resistance | Criteria |
|---|---|---|
| 1 | No blocking | No adhesion or cohesion between contiguous surfaces, which slide freely upon one another. No marring of surfaces. |
| 2 | Very slight blocking | Slight adhesion, adjacent surfaces do not slide freely, but will with frictional pressure. Surface shows no obvious signs of marring. |
| 3 | Slight blocking | Same as above but shows slight surface marring. |
| 4 | Considerable blocking | Adhesion or cohesion of contiguous surfaces, layers may be separated with difficulty. Surfaces may be marred or partially destroyed. |
| 5 | Complete blocking | Blocking to the extent of a complete seal or weld between adjacent surfaces which cannot be separated without destruction of the test specimen. |

The moisture vapor transmission rate of the films prepared from the latices of the present invention was determined in the following manner. The latex was coated by a single pass on a Moss Cote (clay-coated board) using a No. 16 Mayer Rod and a coating weight of 14 to 16 pounds per ream (3000 square feet). The coated samples were immediately dried in a circulated air oven at 120° C. for 20 seconds. Sufficient desiccant to cover the bottom evenly was placed in a clean test dish of the type illustrated in TAPPI Standards, T464 M–45. The test specimen was cut with a die to a size to fit snugly into the flange on the test dish. The specimen was placed in position in the test cup with the coated side up, and steel template was centered on the specimen. Molten wax was allowed to flow into the annular space between the template and the flange thereby providing a moisture tight seal between the edge of the specimen and the test dish. The wax was allowed to harden, and the template was removed. The test dishes with the specimens were placed into a 100° F. forced air oven at 90 percent relative humidity. The test dishes were removed from the oven and weighed after every 24 hours of successive exposure until the moisture gain of the test dishes reached a constant weight. All samples were run in triplicate with a known sample as a control for each group of tests. The MVTR is reported as moisture pick-up in grams of water per 24 hours per hundred square inches at 100° F. and 90 percent relative humidity.

The following table illustrates the physical characteristics of coatings prepared from latices of the present invention.

| Example | MVTR | Blocking | Scoreability hours | | | | | |
|---|---|---|---|---|---|---|---|---|
| | | | 0 | 1 | 3 | 5 | 6 | 8 |
| 1 | 0.29 | 1½ | 3 | 3 | 4 | 4 | 4 | 4 |
| 2 | 0.39 | 1¾ | 1–2 | 4 | 2 | 2–3 | 3 | 3–4 |
| 3 [1] | 0.59 | 2 | 1–2 | 1–2 | 1–2 | 1–2 | 1–2 | 1–2 |
| 4 | 0.27 | 2 | | | | 2 | | 2–3 |
| 5 | 0.31 | 1¾ | | | | 3–4 | | 3–4 |
| 6 | 0.32 | 1½ | | | | 3 | | 3–4 |

[1] Control.

In addition to the above-described improvement in physical characteristics such as blocking, the films prepared from the novel copolymer latices of the present invention also exhibit superior slip characteristics compared to polymers which do not contain methacrylonitrile. "Slip" may be defined as the frictional movement of the films over a surface and is not necessarily related to blocking.

The novel vinylidene chloride copolymer films of the present invention are preferably applied from aqueous dispersions in order to provide the highest degree of the above-mentioned advantageous properties and for ease and economy of applying coatings from aqueous systems.

The novel copolymers of the present invention may also be applied as coatings from solvent systems. Preferred solvents for the copolymers include tetrahydrofuran and mixtures of methyl ethyl ketone and toluene. Other suitable solvents known to the art may also be used. Solvent compositions may be prepared by coagulating a latex such as the latex of Example 1 and then dissolving the thus-coagulated polymer in tetrahydrofuran. Although the concentration of the polymer may be varied over a relatively wide range, a particularly useful solution contains 15 percent polymer. Solvent compositions may also be prepared utilizing suitable solvents and copolymers prepared by solvent polymerization or suspension polymerization as well as the emulsion polymerization procedure set forth above.

While the copolymers of the present invention are particularly useful as coatings on packaging materials, they are also useful as packaging materials per se as free films. Free films may be prepared by casting a layer from a latex or solution on a glass surface, for example, drying, and then removing the thus-formed film. Free films may also be prepared by coagulating the polymer from the latex, washing, and then extruding the film by methods known to the art.

What is claimed is:

1. A film-forming composition comprising an aqueous dispersion of a copolymer of vinylidene chloride, methacrylonitrile, methyl acrylate, and methyl methacrylate wherein said vinylidene chloride is present at a level of 80 to 94 weight percent and said methacrylonitrile is present at a level of 1 to 5 weight percent.

2. A packaging material comprising a base sheet having at least one surface coated with a composition comprising an aqueous dispersion, a copolymer of vinylidene chloride, methacrylonitrile, methyl acrylate, and methyl methacrylate wherein said vinylidene chloride is present at a level of 80 to 94 weight percent and said methacrylonitrile is present at a level of 1 to 5 weight percent.

3. A film-forming composition comprising a aqueous dispersion of a copolymer containing about 89 weight percent vinylidene chloride, about 4 weight percent methyl acrylate, about 5 weight percent methyl methacrylate, and about 2 weight percent methacrylonitrile.

4. A packaging material comprising a base sheet having at least one surface coated with a composition comprising an aqueous dispersion of a copolymer containing about 89 weight percent of vinylidene chloride, about 4 weight percent of methyl acrylate, 5 weight percent of methyl methacrylate, and 2 weight percent of methacrylonitrile.

References Cited by the Examiner

UNITED STATES PATENTS

| | | | |
|---|---|---|---|
| 2,720,511 | 11/1955 | Cupery et al. | 260—32.8 |
| 3,097,178 | 7/1963 | Townsend et al. | 260—29.6 |
| 3,111,507 | 11/1963 | Watt | 260—80.5 |

SAMUEL H. BLECH, *Primary Examiner.*

MURRAY TILLMAN, J. ZIEGLER,

*Assistant Examiners.*